March 15, 1938. R. S. SANFORD 2,111,335
BRAKE
Original Filed Dec. 21, 1932

INVENTOR.
ROY S. SANFORD
BY
ATTORNEY

Patented Mar. 15, 1938

2,111,335

UNITED STATES PATENT OFFICE 2,111,335

BRAKE

Roy S. Sanford, New York, N. Y., assignor to Bendix Aviation Corporation, South Bend, Ind., a corporation of Delaware Original application December 21, 1932, Serial No. 648,300. Divided and this application October 12, 1935, Serial No. 44,663

2 Claims. (Cl. 188—264)

This invention relates to brakes, and is illustrated as embodied in novel brake drums having means for absorbing part of the heat developed during brake application. An object of the invention is to minimize the temperature attained by the drum during braking, by absorbing part of the heat.

One desirable construction includes a drum formed with an annular peripheral chamber containing heat absorbing material. In one embodiment this material is preferably one having a low boiling point and a high latent heat of evaporation, so that the latent heat of vaporization is utilized to absorb braking heat. Such materials are sulphur dioxide and ethyl chloride. This embodiment also illustrates the use of ribs arranged internally of the annular chamber to transmit heat efficiently to the heat absorbing material.

In another embodiment air is utilized as the heat absorbing material, and a relief valve is arranged to discharge into the drum against the friction means some of the air as the rising temperature increases the pressure inside the annular chamber. Preferably this drum is provided with a check valve opening into the chamber from the exterior of the drum, to provide for replacement of the air as the drum cools.

Figure 1:
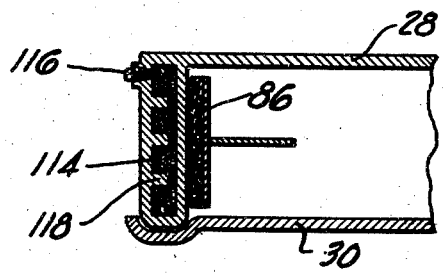
Figure 2:
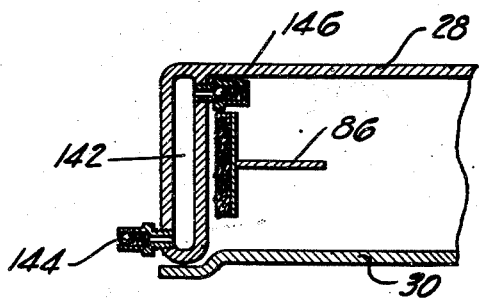

The above and other objects and features of the invention, including various novel combinations and arrangements, will be apparent from the following description of the illustrative embodiments shown in the accompanying drawing, in which:

Figures 1 and 2 are partial radial sections through two different drums embodying respectively different forms of my invention.

Figure 1 shows a rotatable brake drum 28, having a support such as a backing plate 30 at its open side, and containing friction means such as shoes 86 engageable with the cylindrical braking surface of the drum.

In this embodiment, the drum is formed with an annular peripheral chamber 114, partly filled (by removing a plug 116) with a material having a low boiling point and a high latent heat of evaporation, such as sulphur dioxide or ethyl chloride. The drum is preferably formed with heat transmitting ribs 118 projecting into the annular chamber. Thus a considerable part of the heat of braking may be absorbed in vaporizing the fluid in chamber 114, thereby minimizing its effect on the drum and the tires.

In Figure 2, the drum 28 is formed with an annular peripheral chamber 142 containing air as the heat absorbing material. The air is sucked from the exterior of the brake into the chamber 142, as the brake cools off after having been applied, through an inwardly-opening check valve 144. When the brake is applied, the air absorbs part of the heat, expands, and part of it is forced into the interior of the brake drum through a relief valve 146, carrying with it the heat which it has absorbed.

While two illustrative embodiments have been described in detail, it is not my intention to limit the scope of my invention to those particular embodiments, or otherwise than by the terms of the appended claims. The present application is a division of my application No. 648,300, filed December 21, 1932.

I claim:

1. A brake drum having an annular peripheral chamber containing air, and provided with a relief valve and with a check valve opening into said chamber.

2. A brake drum having an annular peripheral chamber containing air, and provided with a relief valve opening into the interior of the drum and also with a check valve opening into said chamber from the exterior of the drum.

ROY S. SANFORD.